April 14, 1925.
C. F. RYBA
1,533,143
RIDING ATTACHMENT FOR GRAIN DRILLS
Filed March 27, 1924
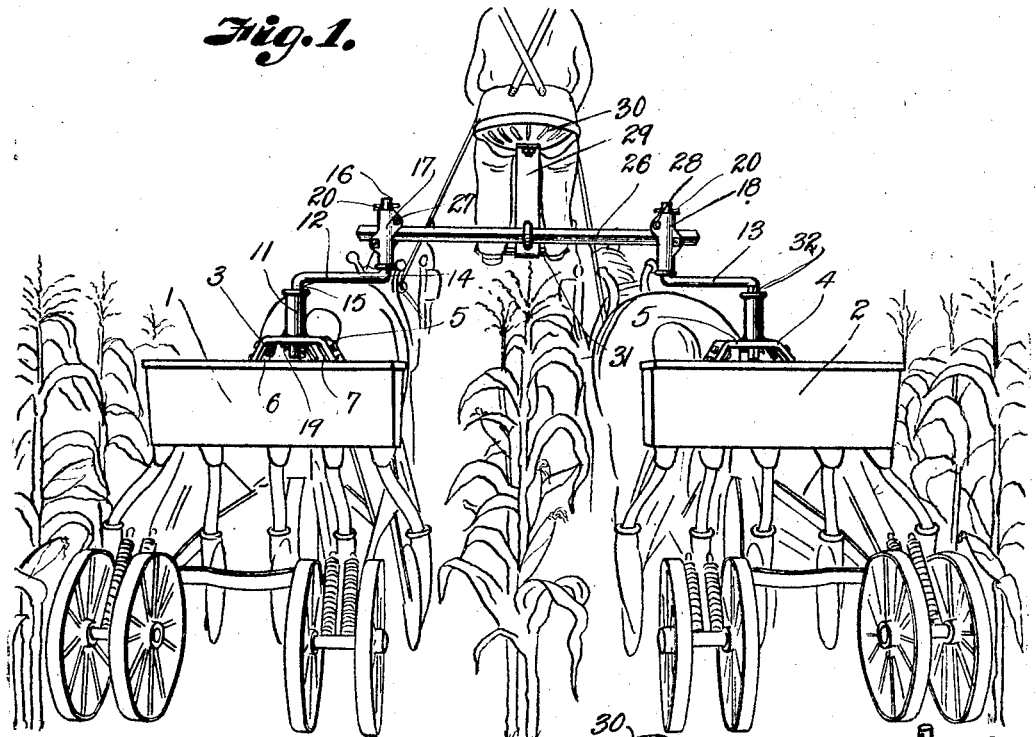
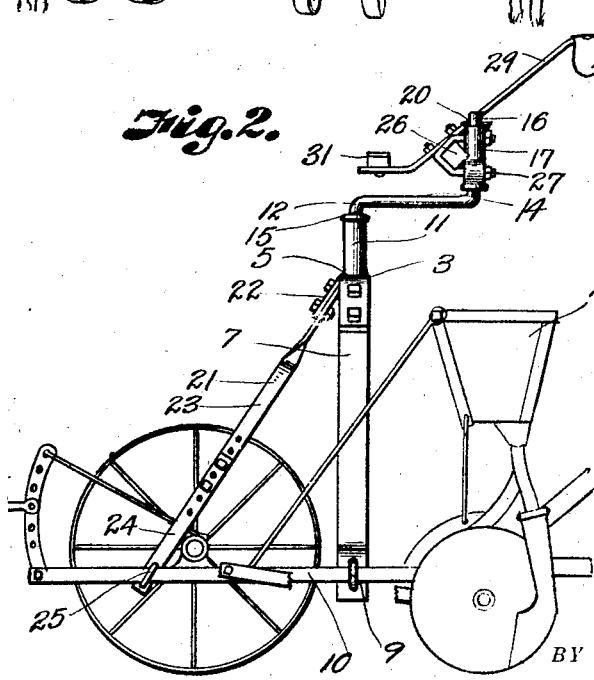
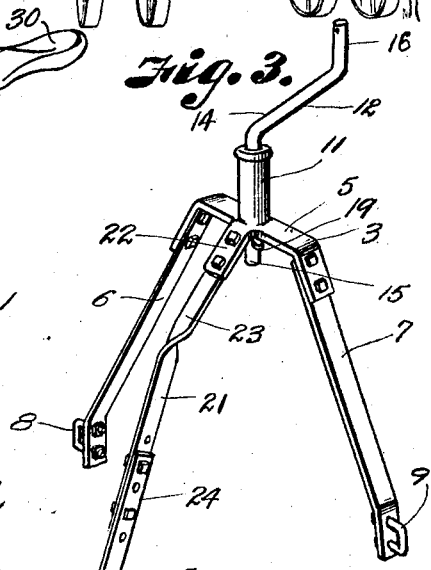
INVENTOR
Charles F. Ryba.
ATTORNEY Patented Apr. 14, 1925.

1,533,143

UNITED STATES PATENT OFFICE.

CHARLES F. RYBA, OF BEARDSLEY, KANSAS.

RIDING ATTACHMENT FOR GRAIN DRILLS.

Application filed March 27, 1924. Serial No. 702,271.

*To all whom it may concern:*

Be it known that I, CHARLES F. RYBA, a citizen of the United States, residing at Beardsley, in the county of Rawlins and State of Kansas, have invented certain new and useful Improvements in Riding Attachments for Grain Drills; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a riding attachment for grain drills. In certain parts of the country, for example Kansas, it is the practice to drill in wheat between rows of corn while the stalks are still standing and for this purpose one horse wheat drills are employed. The drilling in of the wheat by a single drill is a slow method so some farmers handle two drills which of course necessitates the driving of two horses. In handling the two drills, they must be driven on opposite sides of the row of corn and usually the corn stalks extend above the drills so this method has the disadvantage that the corn stalks become broken during the drilling in period and the method also has the added disadvantage that the driver has difficulty in handling the off horse; besides on account of the screen formed by the row of corn stalks he cannot observe the action of the drill on the off side, the result being that two drills cannot be used with as great efficiency as is possible with a riding attachment.

I have therefore provided a novel riding attachment with a seat support which will bridge the rows of corn so that the driver may sit above the top of the stalks and control the two horses on each side of the row in an easy and efficient manner, thus he is enabled to control both horses without undue effort and at the same time he is able to observe both drills with equal facility and thereby keep them in the spaces between the rows. My invention therefore consists in a riding attachment comprising brackets fastened to the frames of the drills with seat supporting arms in the bracket connected by a seat perch upon which the seat is carried, the connections being such that there is certain flexibility in the connections so that provision is made for inequalities of pull by the draft animals, that is one drill may have certain relative movement independent of the other but they will be maintained in proper later spaced relation at all times.

The novel construction of the preferred embodiment of my invention will be specifically referred to hereinafter, reference being had to the accompanying drawings, in which—

Fig. 1 is a rear elevational view of two one-horse grain drills with my invention applied.

Fig. 2 is a side elevational view of a grain drill with a supporting bracket secured thereto, and Fig. 3 is a detailed perspective view of one of the brackets.

The two grain drills 1 and 2 are of standard construction and are horse drawn in the usual manner. To the frames of the drills are secured brackets 3 and 4. Each bracket is shown as comprising a yoke consisting of a top bar 5 and two depending side bars 6 and 7, at the lower ends of which are shackles 8 and 9 for attachment to the side bars of the frame 10. The U-shaped bracket may be constructed of strap iron, commercial bars or cast in a single piece if desired, and the top bar 5 carries a tubular sleeve 11 to receive the seat perch supporting arms 12 and 13. The arms 12 and 13 are in the form of cranks, that is each arm has an intermediate portion 14 with a downwardly projecting end 15 receivable in the tube 11 and an upwardly projecting end 16 receivable in one of the tubes 17 and 18 as the case may be. The downwardly projecting end 15 is held in its tube 11 by a cotter pin or similar device 19. The upper end 16 of each arm has a cotter pin or similar device 20 extending through it to hold its tube or sleeve 17 or 18 against displacement. The bracket in each instance is braced by a brace bar 21 secured to a depending finger 22 on bar 5. The brace bar 21 is sectional, in that it consists of two parts 23 and 24 which may be adjusted one with the other so as to tilt the brackets with respect to the frame for the purpose of tilting the seat backward or forward and the lower end of the brace 21 is fastened to the frame of the drill by a fastening device 25. The seat perch 26 is fastened to the sleeves 17 and 18 by U-bolts 27 and 28, but obviously any suitable fastening means may be employed.

The perch 26 is angular so that it will not turn in its supporting members and the seat perch carries a seat bar 29 on one end of which is the seat 30 and at the other end of which is the foot rest 31. I prefer to fasten one of the arms 12 or 13 in its complementary sleeve or socket member 11 so that it will not turn with respect thereto and in order to do this, I make one of the arms 15 angular in cross section as indicated at 32, so that it is received in a complementary socket, the other tube 11 for the bracket on the opposite drill is round however as are also the bores of the sleeves 17 and 18, therefore one of the arms 12 or 13, for example 13 will be fixed with respect to its complementary socket 11 but there will be loose connections between the upstanding end 16 and the sleeve 18 and a loose connection between the sleeve 17 and the upstanding end of its arm 12 and there will be a loose connection between the opposite sleeve 11 on the bracket 3.

The rider may sit upon the seat and above the top of the rows of corn so that he will have a full view of the field before him. He will sit in a natural riding position so that he can drive the horses as a team maintaining the drills in their proper relative positions guiding them between the rows of corn so that the wheat can be drilled in, in a most convenient manner and on account of the convenience the drilled in acreage at the end of the day will be much greater than has been practicable by the old method.

What I claim and desire to secure by Letters Patent is:

In combination with a pair of grain drills, a bracket on each of the grain drills provided with a socket, perch arms, each having an end located in one of said sockets, sleeves movably mounted on the opposite ends of said arms, a perch bar fixed to said sleeves and connecting the grain drills in spaced relation, and a driver's seat fixed on said perch bar, one of the perch arms having non-rotatable connection with its socket, the other arms and said sleeves being rotatably mounted.

In testimony whereof I affix my signature.

CHARLES F. RYBA.